United States Patent
Pan et al.

(10) Patent No.: US 7,460,131 B2
(45) Date of Patent: Dec. 2, 2008

(54) METHODS AND SYSTEMS FOR PROCESSING IMAGE DATA FOR DISPLAY ON LC DISPLAYS

(75) Inventors: Hao Pan, Vancouver, WA (US); Xiao-Fan Feng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 567 days.

(21) Appl. No.: 11/122,922

(22) Filed: May 4, 2005

(65) Prior Publication Data

US 2005/0200631 A1 Sep. 15, 2005

Related U.S. Application Data

(63) Continuation-in-part of application No. 10/676,312, filed on Sep. 30, 2003.

(60) Provisional application No. 60/574,059, filed on May 24, 2004.

(51) Int. Cl.
G09G 5/02 (2006.01)

(52) U.S. Cl. ................ 345/600; 345/650; 382/232; 382/239; 382/251

(58) Field of Classification Search ........... 345/600, 345/650; 382/232, 239, 251
See application file for complete search history.

(56) References Cited

U.S. PATENT DOCUMENTS 5,128,757 A * 7/1992 Citta et al. ............ 375/240.01
6,915,019 B2 * 7/2005 Lei et al. .................. 382/253
7,054,539 B2 * 5/2006 Ito et al. .................... 386/46
2003/0080983 A1 5/2003 Someya et al.
2003/0231158 A1 12/2003 Someya et al.
2005/0143136 A1 * 6/2005 Lev et al. .................. 455/566

FOREIGN PATENT DOCUMENTS

JP 2003345318 12/2003

OTHER PUBLICATIONS

T. Furuhashi & et al., "High Quality TFT-LCD System for moving picture", pp. 1284-1287, SID 2002 Digest, (Hitachi, Compression Ration:5).

H. Okumura, et al., "Advanced level adaptive overdrive (ALAO) method applicable to full HD_LCTVs", pp. 68-71, SID Digest 2002 (Toshiba, compression ratio:2).

Someya, J, et al., "Reduction of Memory Capacity in Feedforward Driving by Image Compression", pp. 72-75, SID Digest 2002, (Mitsubishi, compression ratio: 10).

Someya, J. et al., "A new LCD controller for improvement of response time by compression FFD", pp. 1346-1349, SID Digest 2003, (Mitsubishi, compression ratio: 3.42.

Kawabe, K, et al., "New TFT-LCD Driving Method for Improved Moving Picture Quality", pp. 998-1001, SID Digest 2001.

Nakanishi, K, et al., "Fast Response 15-in. XGA TFT-LCD with Feedforwarding Driving (FFD) Technology for multimedia Applications", pp. 488-491, SIS Digest 2001.

Song, J., et al., "DCCII: Novel Method for Fast Response Time in PVA Mode", pp. 1344-1347, SID Digest 2004.

* cited by examiner

*Primary Examiner*—Kimbinh T Nguyen
(74) *Attorney, Agent, or Firm*—Krieger Intellectual Property, Inc.; Scott C. Krieger

(57) ABSTRACT

Embodiments of the present invention comprise methods and systems for processing image data for use on LCD displays.

11 Claims, 8 Drawing Sheets

METHODS AND SYSTEMS FOR PROCESSING IMAGE DATA FOR DISPLAY ON LC DISPLAYS

RELATED REFERENCES

This application is a continuation-in-part of U.S. patent application Ser. No. 10/676,312, entitled "Method and System for Liquid Crystal Display Overdrive," invented by Hao Pan and filed on Sep. 30, 2003; this application also claims the benefit of U.S. Provisional Patent Application No. 60/574,059 filed May 24, 2004.

BACKGROUND OF THE INVENTION

Current Liquid Crystal (LC) televisions (LCTVs) use overdrive techniques to accelerate the slow response of LC pixels so as to improve the picture quality of dynamic contents. The cost of overdrive is high, especially when the picture resolution of an LCTV set is high. The overdrive technique requires memory to buffer at least one frame of video. The memory buffer is often too large to be integrated into the IC chip that performs the overdrive. To connect this external memory chip to the overdrive IC, a significant number of pins in the overdrive chip need to be allocated. Further, the data rate between the two chips is required to be sufficiently high. These are among the factors that make the cost of overdrive high and potentially reduce the reliability of the entire system.

Overdrive techniques may be classified into two types: (i) non-recursive, and (ii) recursive. For the non-recursive overdrive, the current solutions to this problem are to compress the frame to reduce its memory buffer size and simultaneously reduce the data transfer rate. Some methods reduce the size of memory sufficiently so that the memory buffer may be integrated into the overdrive IC. On the other hand, there is no existing solution for the other type of overdrive method, namely the recursive overdrive. Embodiments of the present invention provide a solution for memory-efficient recursive overdrive systems and methods.

BRIEF SUMMARY OF THE INVENTION

Embodiments of the present invention comprise systems and methods for compressing a frame buffer in a recursive LC overdrive system. Existing frame buffer compression techniques apply only to non-recursive overdrive systems. Recursive and non-recursive overdrive techniques have different structures, and therefore the current solutions for non-recursive overdrive are not applicable to a recursive overdrive system.

Some embodiments of the present invention comprise compression methods that are more efficient than existing methods. The compression methods of these embodiments effectively integrate bit-depth reduction based on overdrive sensitivity, color redundancy reduction, and spatial correlation reduction. The compression methods in current existing solutions do not combine these three components simultaneously and seamlessly.

Some embodiments of the present invention comprise methods and systems for reducing undesirable compression noise in still scenes or still regions of moving images in the compressed domain. In these embodiments, information from only one of the three color channels may be used. Some existing methods do this in the de-compressed domain (i.e., processing a larger amount of data) and require information from all three color channels. Accordingly, these embodiments perform more efficiently than known methods.

Some embodiments of the present invention also comprise a unique spatial correlation reduction method. In some of these embodiments, an adaptive version of BTC (Block Truncation Coding) may be used where the adaptivity is specifically tailored for the overdrive system.

The systems and methods employed in embodiments of the present invention differ from the compression methods used for still image compression. Although the two areas may use similar compression techniques, the processes, results and data usage are very distinct. In embodiments of the present invention the compression results are not directly for perception by humans but for deriving the overdrive value. Therefore, image characteristics related to visual perception may be de-emphasized or ignored. Another difference from still image compression is that the computation must be in real-time and at high-speed. A further difference is that the buffer must not over-flow at anytime. In some embodiments of the present invention, as opposed to known still image compression methods, compression and de-compression may work simultaneously and share the same memory buffer.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
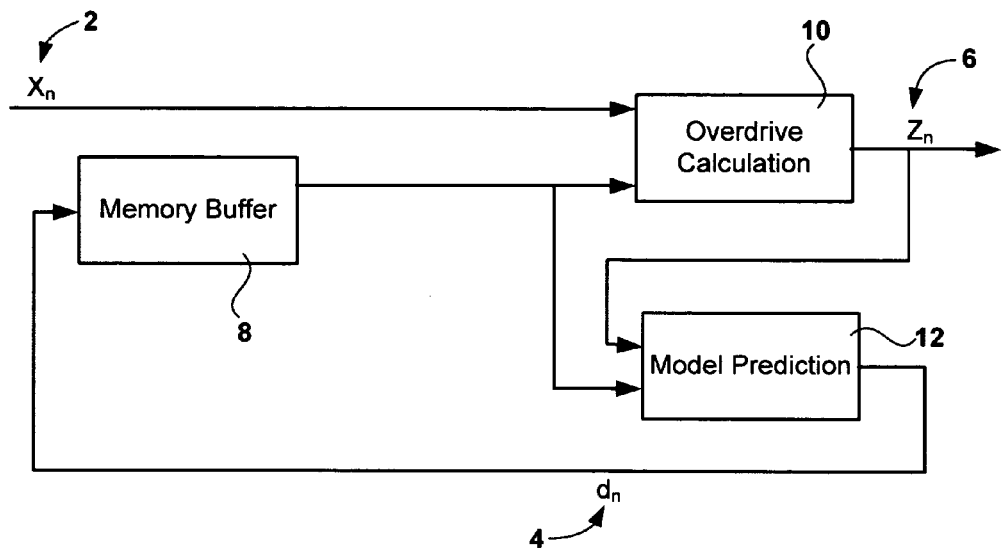
FIG. 1 is a diagram of a recursive overdrive without buffer compression.

Embodiments of the present invention comprise systems and methods for improving the efficiency in an overdrive system of a liquid crystal display (LCD). Some embodiments of these systems and methods comprise compressing a frame buffer for a recursive overdrive in an LCD device. A block diagram of a recursive overdrive system without buffer compression is shown in FIG. 1. In FIG. 1, $x_n$ 2 is the current input image where subscript n is the frame index, $d_n$ 4 is the current predicted actual image displayed on the LC screen. Ideally, $d_n$ 2 should be the same as $x_n$ 4 to achieve accurate rendering.

Due to the slow response of LC pixels, directly using $x_n$ 2 to drive LC pixels results in poor image quality and undesirable artifacts when the pixel elements cannot respond accurately at video frame rate speed. Therefore, $z_n$ 6, an overdriven image is sent to LC pixels. $z_n$ 6, is calculated by the overdrive calculation module 10 to make $d_n$ 4 as close as possible to $x_n$ 2. After overdrive, $d_n$ 4 may still be different from ideal input image $x_n$ 2 because $d_n$ 4 is predicted by an LCD display prediction module 12, which predicts the actual display values achieved by the display. A previously predicted image $d_{n-1}$ is one-frame-delayed $d_n$ 4 for both the overdrive calculation 10 and prediction module 12. $d_n$ 4 may be stored in a memory buffer 8 and held for a frame period resulting in $d_{n-1}$. This delayed image $d_{n-1}$, may then be used in conjunction with the current $x_n$ 2 to determine a transition state for the pixel.

Image data may be represented in a color image as R, G and B values. In these embodiments, each of all the above notations may contain three color elements. Specifically, $d_n = [d_n^R, d_n^G, d_n^B]$, $d_{n-1} = [d_{n-1}^R, d_{n-1}^G, d_{n-1}^B]$, $x_n = [x_n^R, x_n^G, x_n^B]$ and $z_n = [z_n^R, z_n^G, z_n^B]$.

High Definition (HD) and other high resolution displays require high data transfer rates and large amounts of memory. For example, if the resolution of an LC TV is 1366×768 and the frame rate is 60 fps, then the memory is 3.14M bytes and the minimum data transfer rate is 189M bytes per second. Obviously, it is beneficial to reduce the memory size and the data transfer rate by compression methods.

Compression Techniques

Some embodiments of the present invention may be described with reference to FIG. 2. In these embodiments, the predicted image $d_n$ 28 is not directly sent to and stored in the memory buffer 18. Instead, $d_n$ 28 is first compressed to $Cd_n$ 32, and $Cd_n$ 32 is then sent to the memory buffer 18. Data, $Cd_n$ 32, stored in the buffer may be held in memory for a frame period resulting in $Cd_{n-1}$ 30, which, once delayed, now represents the prior image frame (n-1). This data, $Cd_n$ 32, may then be de-compressed to $DCd_{n-1}$ 34, and sent to a still pixel detection module 22. The still pixel detection module 22 may reduce noise due to compression error in still scenes or still regions of moving images. Finally $d_{n-1}$ 36 is recovered and sent to the overdrive calculation module 14 and model prediction module 16.

Figure 2:
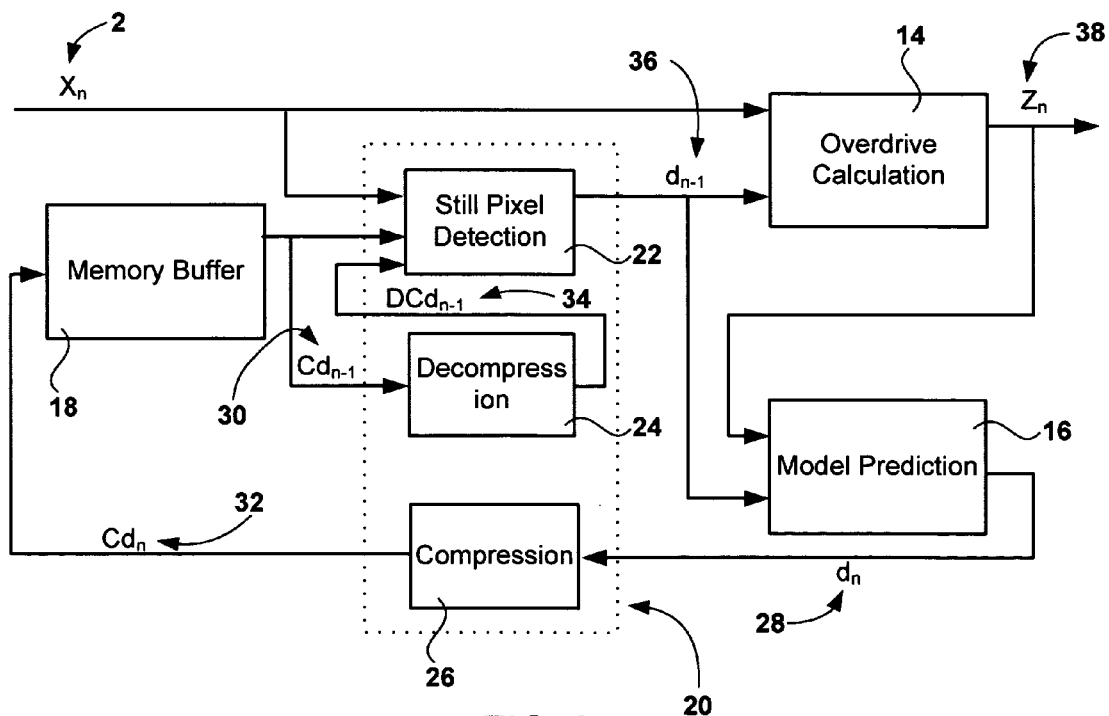
FIG. 2 is a diagram of embodiments of the present invention comprising recursive overdrive with buffer compression.

As shown in FIG. 2, the buffer compression algorithm has three modules: compression 26, decompression 24, still pixel detection 22. The compression module 26 compresses the image, the decompression module 24 decompresses the image, and the still pixel detection module 22 reduces compression noise in still scenes or still regions of moving images. Each of these modules is explained in further detail below.

The Compression Module

Figure 3:
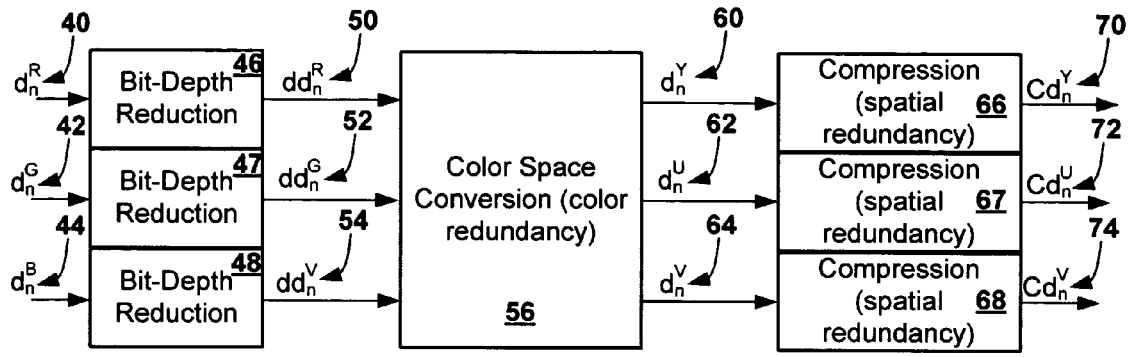
FIG. 3 is a diagram of a compression module of embodiments of the present invention.

Embodiments of the present invention may compress image data in a variety of ways including combinations of these methods. The compression module may reduce the size of $d_n$ 28 using one or more of the following three aspects: (i) reducing the bit-depth based on overdrive sensitivity, (ii) reducing the color redundancy based on human visual system's sensitivity, and (iii) reducing spatial redundancy based on neighborhood correlations in natural images. In some embodiments, there may be three serially connected components in the compression module: (i) bit-depth reduction, (ii) color space conversion with down-sampling, and (iii) compression with spatial redundancy reduction. A diagram of an exemplary compression module is shown in FIG. 3, where $d_n$ is represented by its three individual RGB color components, $d_n^R$ 40, $d_n^G$ 42 and $d_n^B$ 44. In the exemplary embodiments shown in FIG. 3, multiple bit-depth reduction modules 46, 47 & 48 are shown, however, in some embodiments, a single module may perform bit-depth reduction on all or multiple color channels. After bit-depth reduction, color space conversion 56 may be performed. Generally, this step involves conversion from a luminance-integrated color space such as RGB, where each color component is represented individually by a value that incorporates luminance, to a luminance-segregated color space, such as YUV or YCbCr where chrominance and luminance are represented in separate channels. In the embodiments illustrated in FIGS. 3 & 4, the YCbCr color space is used as an example. In these embodiments, compression is further enhanced through spatial redundancy reduction modules 66, 67 & 68. In some embodiments, a single spatial reduction module may be applied to multiple channels, such as to both color channels or even all channels, however, the luminance channel is typically preserved at a higher resolution than the color channels.

Figure 4:
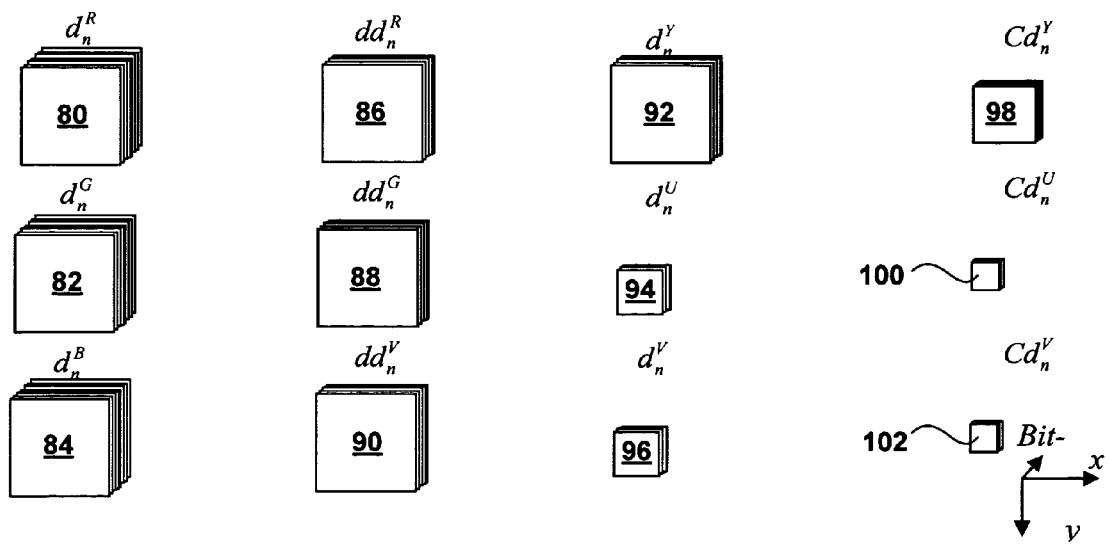
FIG. 4 is a diagram showing the results of various compression methods.

The effects of the above three components in the compression module of some exemplary embodiments are illustrated in FIG. 4. In the exemplary embodiments shown in FIG. 4, the bit-depth component 46, 47 & 48 only reduces bit depth; the color space conversion module 56 only reduces resolutions in the two color channels 94 & 96; and the spatial redundancy compression components reduce the sizes of the three converted color/luminance channels 98, 100 & 102. In FIG. 4, color bit-depth is shown as a dimension going into the page (perpendicular to the page surface) and is shown graphically as multiple, stacked sheets of paper. In the original image, the image is represented as three separate color channels 80, 82 & 84 with full bit depth, separate color channels, and full spatial resolution. The bit-depth reduced image 86, 88 & 90 is shown with a reduced stack of sheets of paper representing reduced color bit-depth, but full spatial resolution in all of the separate color channels.

Color space conversion 56 then converts the image to a luminance-segregated color space (i.e., YCbCr) wherein the luminance channel 92 is preserved in its full spatial resolution, but the converted color channels 94 & 96 are reduced spatially. In some embodiments, the color channel spatial resolution may not be reduced. This reduction in the color channels may be a function of the specific color space being used. The YCbCr color space specification may employ a reduced color channel spatial resolution, which is reflected in the exemplary embodiments shown in FIG. 4.

Spatial redundancy compression is also applied in these embodiments to yield an image with further compression. The final image channels 98, 100 & 102 are further reduced in spatial resolution as shown by their reduced size in FIG. 4.

The Bit-depth Reduction Component

In an LCD TV, signals are usually represented by 8 bits each, corresponding to 256 quantization steps. Nevertheless, for overdrive purposes, 8 bits of $d_{n-1}$ and $d_n$ are more than enough to derive overdrive $z_n$ so compression is advantageous.

Overdrive value $z_n$ is determined from the current input value $x_n$ and the previous predicted display value $d_{n-1}$, mathematically as $$z_n = f(x_n, d_{n-1})$$

To emphasize the role of $d_{n-1}$, we rewrite the above function as $$z_n = f(x_n, d_{n-1}) = f_{x_n}(d_{n-1})$$

Intuitively, we know that if one quantization step change of $d_{n-1}$ is associated with several step change of $z_n$, then some quantization levels of $z_n$ can never be reached. In this case, $d_{n-1}$ is under-quantized and needs more bits. If several quantization steps' change of $d_{n-1}$ is associated with one step's change of $z_n$, then some quantization levels of $d_{n-1}$ are useless. In this case, $d_{n-1}$ is over-quantized and some bits of $d_{n-1}$ are wasted. For example, if every two quantization steps of $d_{n-1}$ cause one quantization step of $z_n$, then $d_{n-1}$ only needs 7 bits or 128 quantization steps. The extra 1 bit is just wasted without any benefit.

Figure 5:
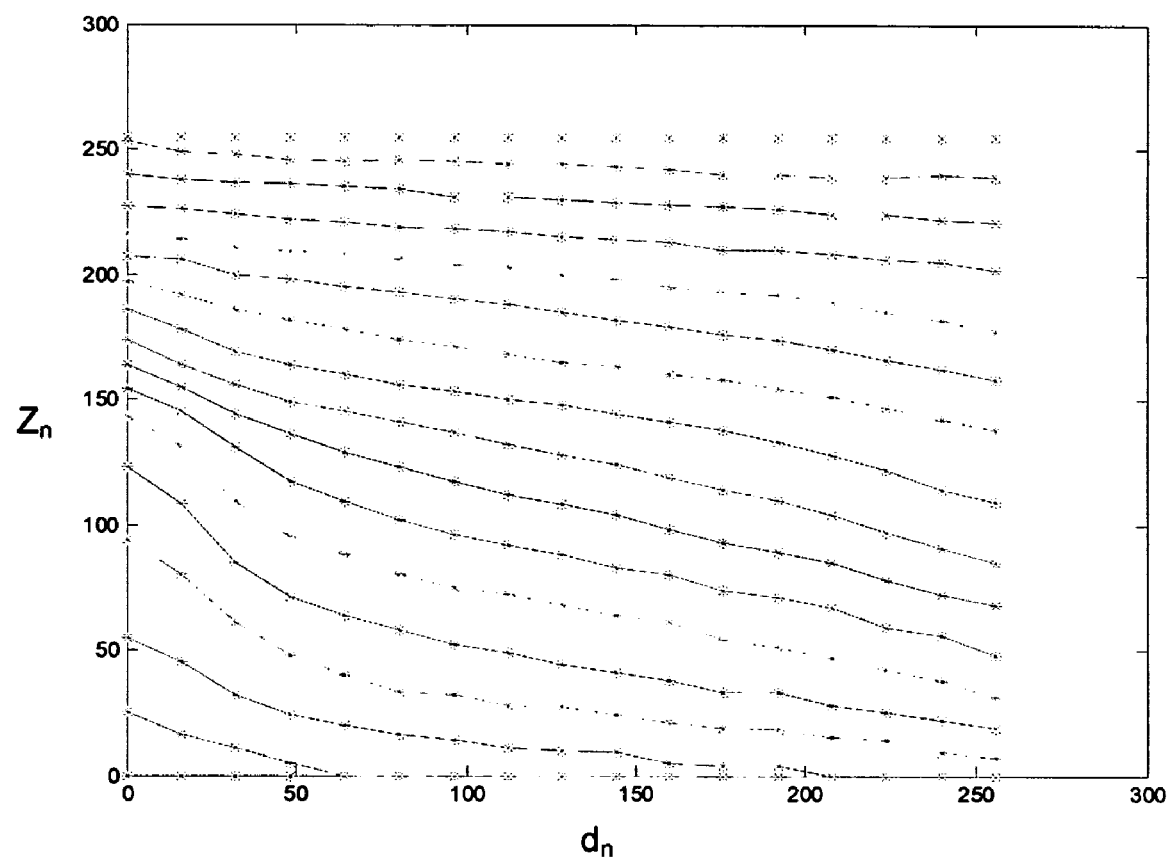
FIG. 5 is a graph showing a relationship between overdrive output and delayed predicted display data.

A practical measured overdrive function $z_n=f_{x_n}(d_{n-1})$ is shown in FIG. 5, in which $d_{n-1}$ is over-quantized. In FIG. 5, each curve represents a curve of $z_n=f_{x_n}(d_{n-1})$ with a particular current input value $x_n$. FIG. 5 clearly shows that when $0 \leq d_{n-1} \leq 48$, one-step change of $d_{n-1}$ indeed causes one-step change of $z_n$ in some $z_n=f_{x_n}(d_{n-1})$; when $48 \leq d_{n-1} \leq 255$, several-steps changes of $d_{n-1}$ causes one-step change of $z_n$. Accordingly, during the interval of $0 \leq d_{n-1} \leq 48$, $d_{n-1}$ is properly quantized and during the interval of $48 \leq d_{n-1} \leq 255$, $d_{n-1}$ is over-quantized. Some embodiments of the present invention comprise methods that quantize $d_{n-1}$ differently in the range of $0 \leq d_{n-1} \leq 48$ than they do in other ranges.

Figure 6:
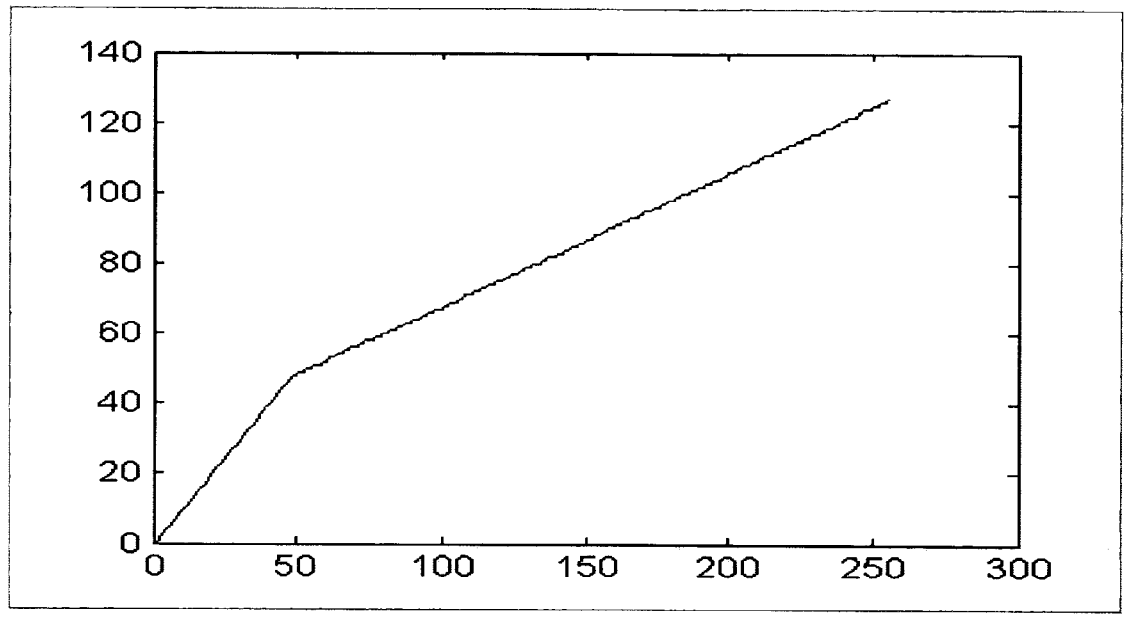
FIG. 6 is a graph showing an exemplary quantization curve of embodiments of the present invention.

Bit-depth reduction can be utilized by a linear mapping, as simple as removing the least bit. To achieve the best performance, however, bit-depth reduction should using a nonlinear mapping function that is carefully derived from $z_n=f_{x_n}(d_{n-1})$. As an example, the nonlinear mapping function curve derived from FIG. 5 is shown in FIG. 6. Derived from the conclusion of the previous paragraph, for $0 \leq d_{n-1} \leq 48$, the mapping is one-to-one; for $48 \leq d_{n-1} \leq 255$, the mapping is multiple-to-one. The total number of bits are reduced from 8 to 7.

The nonlinear mapping changes with the ambient temperature of LC devices, because the overdrive function changes with the ambient temperature. Therefore, different ambient temperatures should have different nonlinear mapping functions.

Bit-depth reduction reduces unnecessary bits, so it should be the first among the three compression components to reduce the processing procedure's effective bit number. Unlike other compression components, bit-depth reduction does not require counter bit-depth extension in de-compression. If the nonlinear mapping function is chosen optimally, the compression is lossless.

Color Space Conversion with Down-Sampling Component

It is well known that the RGB color space is not the most efficient color space representing color images perceived by humans. Many more-efficient color spaces have been developed. A popular one is $YC_bC_r$420 color space, where $C_b$ and $C_r$ are down-sampled by a factor of two on both dimensions. Because of this down-sampling, the total bit number of a frame is reduced by half.

While the standard conversion between RGB and $YC_bC_r$420 requires floating-point computation, the conversion can be approximated and simplified by the following equations:

$Y=(76R+152G+28B)/256$ $C_b=(B-Y)/2$ $C_r=(R-Y)/2$

Accordingly, the reverse-conversion from $YC_bC_r$420 to RGB is $R=Y+2C_r$ $G=Y-94C_b/256-C_r$ $B=Y+2C_b$ Compression with Spatial Redundancy Reduction Neighboring pixels in a natural image usually have strong correlations. Many image compression methods such as JPEG standards have been developed based on reducing the correlations. However, not every image compression method can be used for an overdrive system. Specifically, because we have a limitation of a fixed size of memory buffer, only the compression methods that do not overflow the buffer can be readily used.

In some embodiments of the present invention, Adaptive Block Truncation Coding (ABTC) may be used. These methods have advantages over regular fixed-size Block Truncation Coding (BTC) where the adaptivity is specifically tailored for overdrive.

Figure 7:
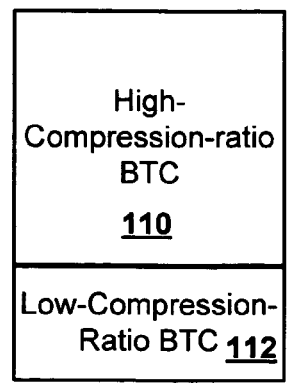
FIG. 7 is a diagram showing memory allocation.

In some of the ABTC embodiments, Adaptive BTC may alternate two BTC algorithms that have different compression ratios. The low-compression-ratio BTC (LBTC) loses less information while the high-compression-ratio BTC (HBTC) gains more compression gain. The alternation between LBTC and HBTC may be based on an error metric and an adaptive threshold. If the error is above the threshold and the memory for BTC with lower compression ratio is still available, the BTC with lower compression ratio is used; otherwise the BTC with higher compression ratio is used. The two BTC algorithms may have their own memory usage quota allocation, as illustrated in FIG. 7. If the memory allocated to HBTC is not used up while the memory allocated to LBTC is overflowed, then the threshold is lowered for the next frame and vice versa. In some embodiments, the error metric may be the mean square error of a block or the maximum absolute error in a block.

Figure 8A:
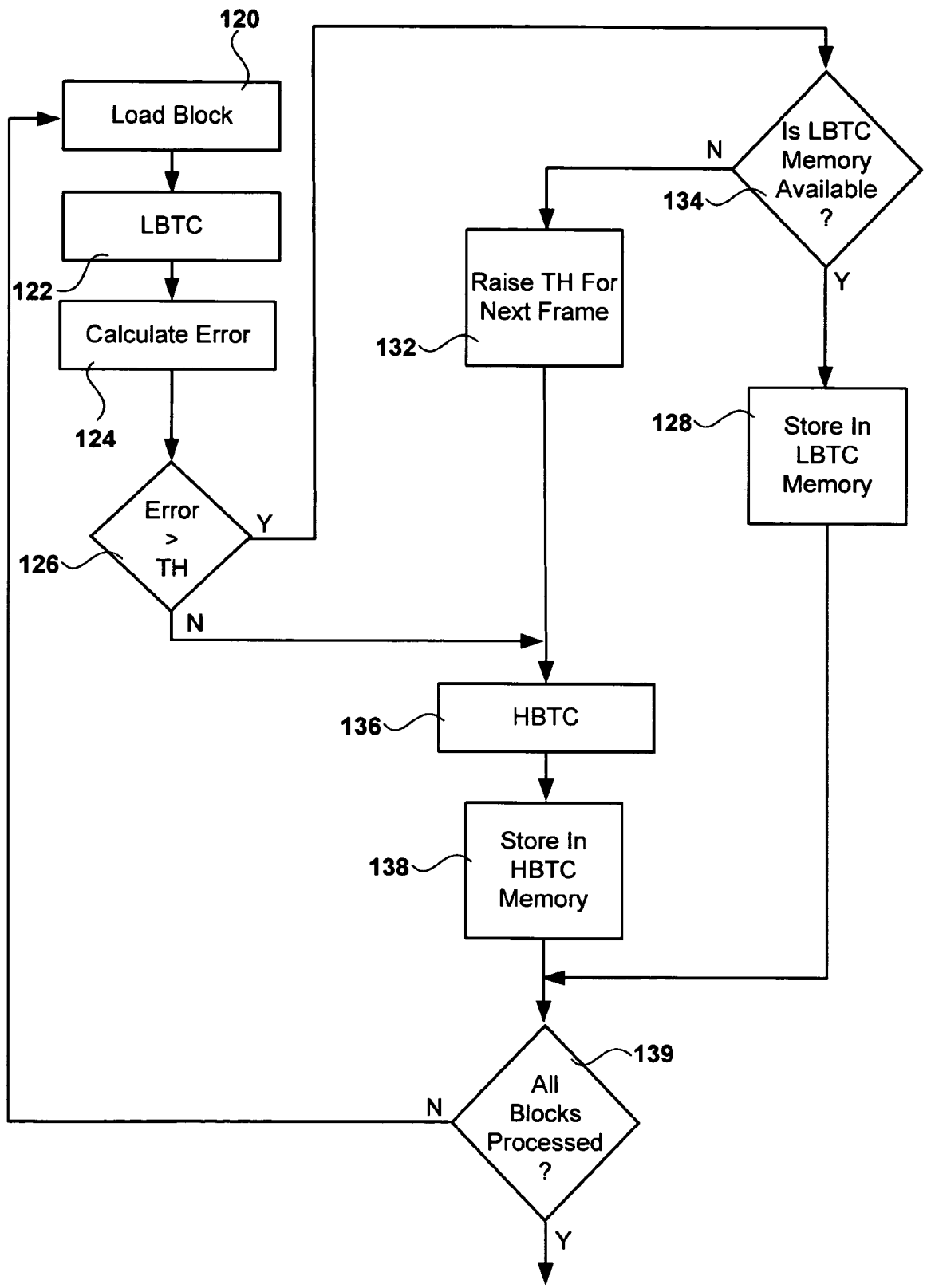
FIG. 8A is a chart showing exemplary steps of an adaptive BTC compression method.

Some embodiments of the present invention may be described with reference to FIG. 8A. These embodiments comprise adaptive BTC (ABTC) methods. In these embodiments, an image block is loaded 120 and a low-compression BTC (LBTC) algorithm is applied 122 to the block data. In some embodiments, the block size may be 4×4 pixels or some other block size. An error is then calculated 124 and this error is compared 126 to a threshold value. If the error is above the threshold value, low-compression BTC (LBTC) memory is checked for availability 134. If LBTC memory is available, the LBTC data is stored 128 in LBTC memory. However, if the error threshold is exceeded 126 and sufficient LBTC memory is not available 134, the error threshold may be raised for a next image frame 132 and a high-compression BTC (HBTC) algorithm may be applied 136 to the data, which is then stored 138 in HBTC memory. A high-compression algorithm may use a different block size, typically larger than that used by the LBTC algorithm. In some embodiments, an 8×8 block size may be used.

When the error threshold is not exceeded 126, an HBTC algorithm may be applied 136 and the data may be stored 138 in HBTC memory.

After a block's data is stored in LBTC memory 128 or HBTC memory 138, the process may continue 139 to the next block of data until an entire image is processed.

Figure 8B:
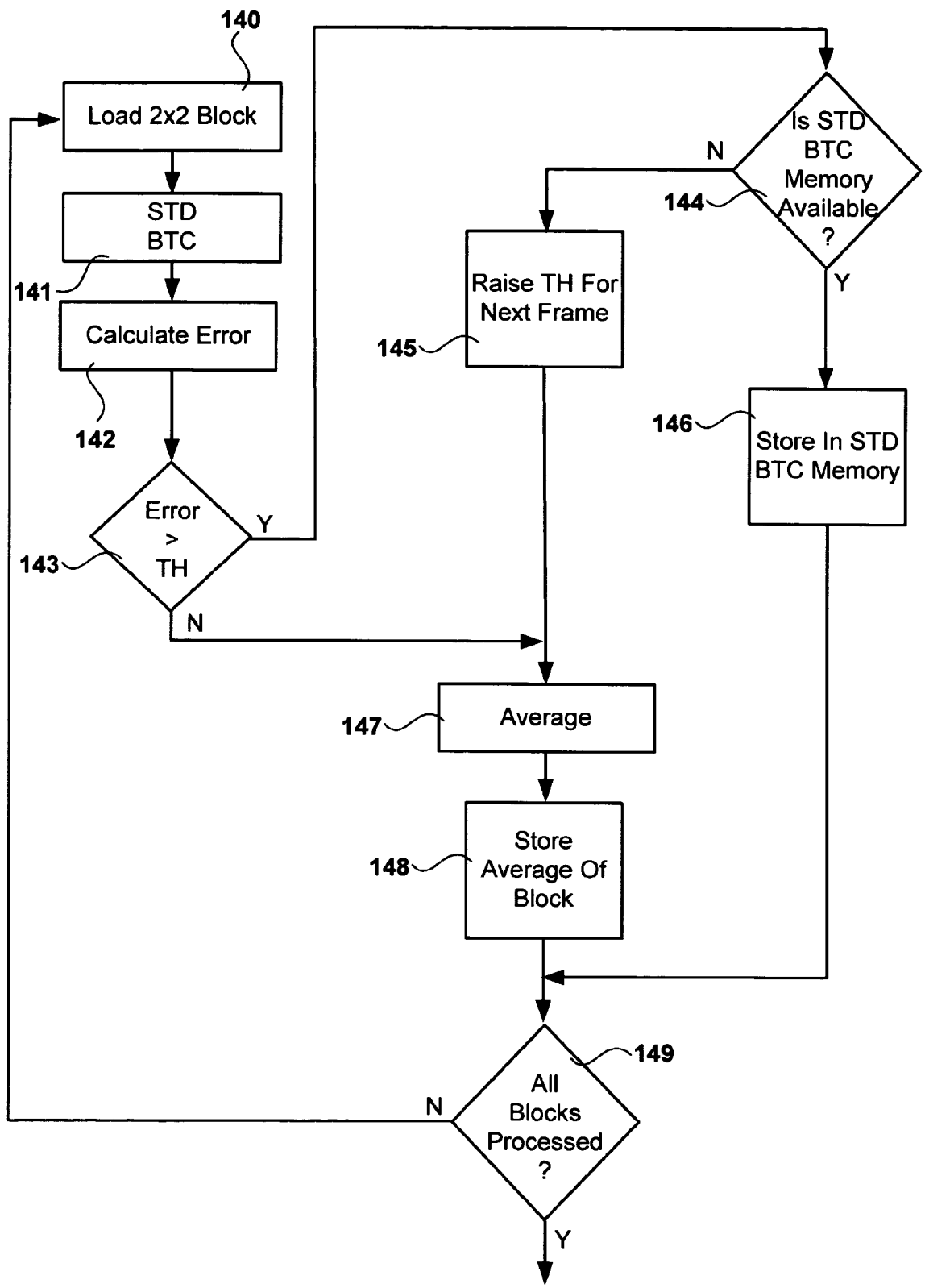
FIG. 8B is a chart showing exemplary steps of an alternative adaptive BTC compression method.

Some embodiments of the present invention may be described with reference to FIG. 8B. These embodiments comprise alternative adaptive BTC (ABTC) methods. In these embodiments, an image block is loaded 140 and a standard BTC (SBTC) algorithm is applied 141 to the block data. In some embodiments, the block size may be 2×2 pixels or some other block size. An error is then calculated 142 and this error is compared 143 to a threshold value. If the error is above the threshold value, standard BTC (SBTC) memory is checked for availability 144. If SBTC memory is available, the SBTC data is stored 146 in SBTC memory. However, if the error threshold is exceeded 126 and sufficient SBTC memory is not available 144, the error threshold for the next frame may be raised 145 and an averaging algorithm may be applied 147 to the data. This averaged data may then be stored 148 in high compression (HC) memory. A high-compression averaging algorithm may use a different block size, but, in some embodiments, the same block size as the SBTC algorithm may be used.

When the error threshold is not exceeded 143, the higher-compression averaging algorithm may be applied 147 and the data may be stored 148 in HC memory.

After a block's data is stored in SBTC memory 146 or HC memory 148, the process may continue 149 to the next block of data, when available or the process may terminate at the last image block.

Decompression

Figure 9:
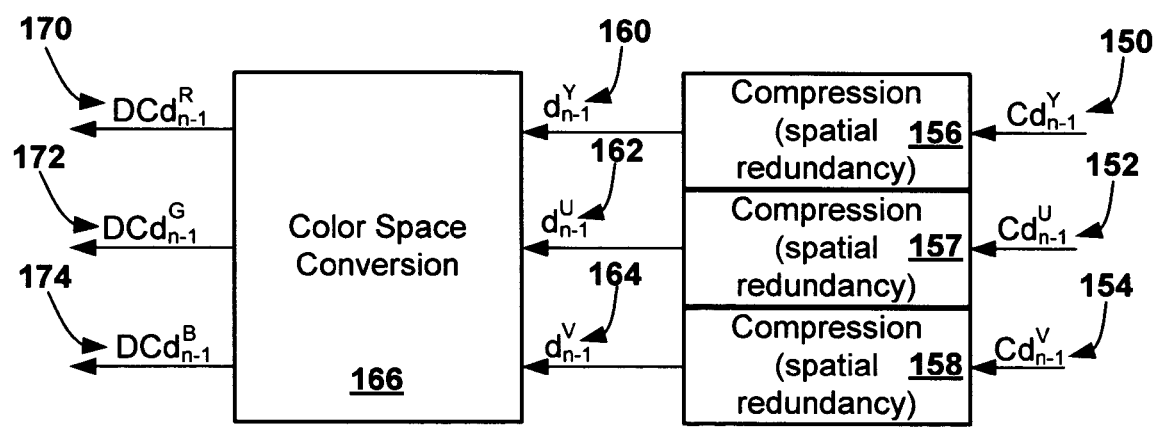
FIG. 9 is a diagram showing an exemplary decompression module.

In some embodiments of the present invention, decompression may be performed essentially as a reverse compression process with the exception that bit-depth expansion is not necessary. The decompression process of some embodiments may be explained with reference to FIG. 9. In these embodiments, the fully compressed image data 70, 72 & 74, resulting from the processes described in relation to FIG. 3, has been stored in memory 18 (FIG. 2) and delayed for at least one frame interval. This compressed and delayed data 150, 152 & 154 is decompressed 156, 157 & 158 and converted 166 back to a luminance-integrated color space, such as RGB. This delayed and decompressed image data 170, 172 & 174; 34 may then be used for still pixel detection 22 and overdrive calculation 14.

Still Pixel Detection

In some embodiments of the present invention, the decompressed image may be different from the original image. These errors can occur as the result of lossy compression processes, quantization and for other reasons. These errors may cause further errors in the overdrive calculation processes. However, due to the dynamic nature of image content, OD errors caused by compression errors usually are not noticeable. Nevertheless, OD errors become obvious when a video sequence containing still images or still regions is displayed.

Figure 10:
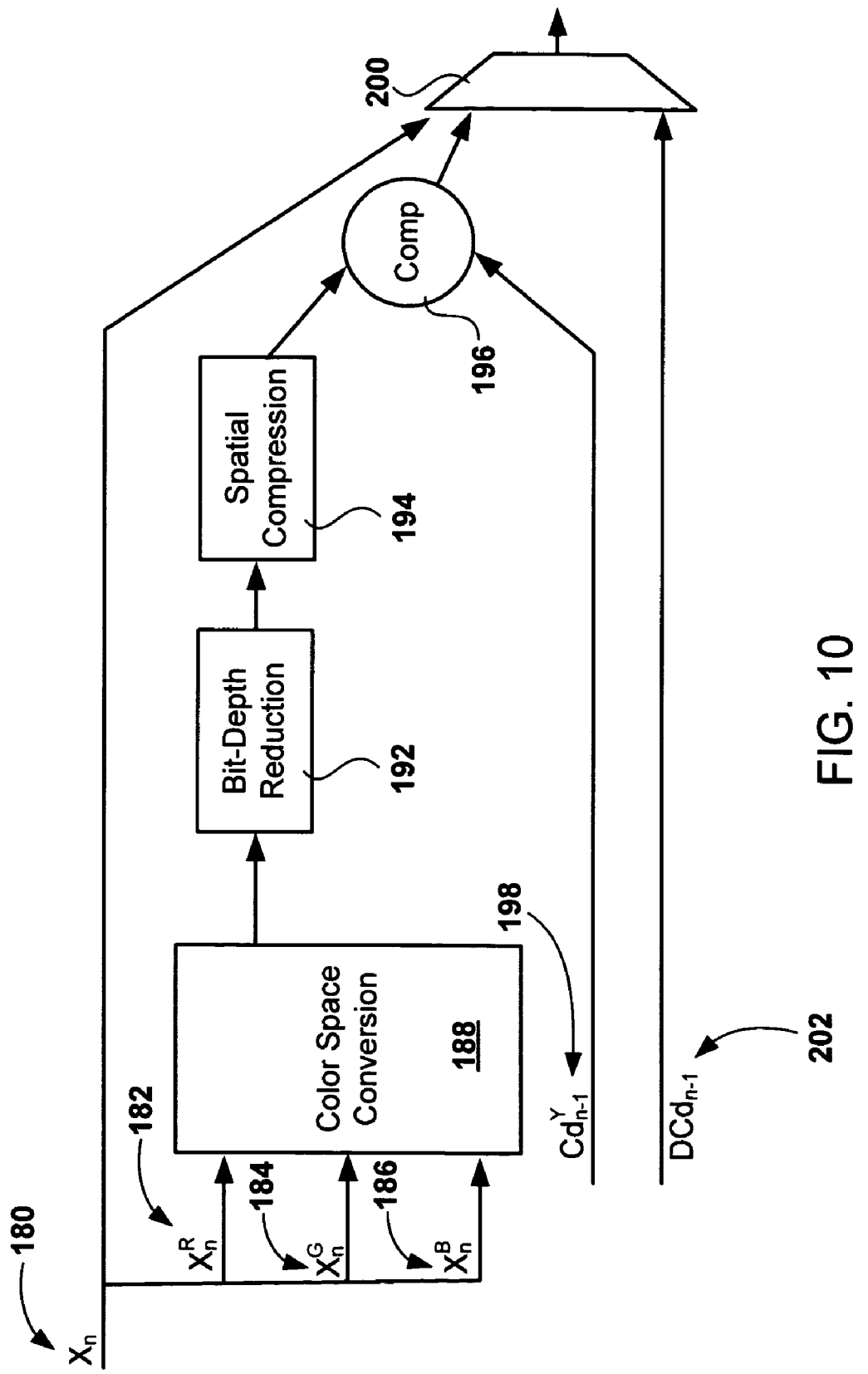
FIG. 10 is a diagram showing an exemplary still pixel detection module.

Some embodiments of the present invention comprise a still pixel detection module. An exemplary still pixel detection module (SPDM) is illustrated in FIG. 10. The goal of the SPDM is to detect differences between the current pixel and the previous pixel and determine whether these differences are caused by compression error. In some embodiments, the module compresses the current frame and compares the compressed data with the compressed data stored in the buffer. If there is no error at a given pixel, this pixel may be classified as still. In some embodiments, as shown in FIG. 10, these processes may be based on a subset of the image data channels. This can help simplify the implementation. In the exemplary embodiments, shown in FIG. 10, the detection is based solely on the Y channel.

In the exemplary embodiments illustrated in FIG. 10, an image 180 is read into the system and split into its constituent RGB color channels 182, 184 & 186. These color channels 182, 184 & 186 are then converted 188 to a luminance-segregated color space, such as YUV or YCbCr. In these exemplary embodiments, only the Y (luminance) channel 190 is used for still pixel detection. The Y channel is bit-depth reduced 192 and compressed spatially 194 using the same methods that are used to process the image before buffering. The buffered image 202 and the processed Y channel data are then compared 196 to determine whether image pixels are still. Still pixels may then be tagged 200 as such and treated differently in further processing.

In some embodiments of the present invention, when a block is identified as still, the overdrive calculation may be omitted for the pixels in that block and the image input value $x_n$ may be used as the output value $z_n$.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for processing image data in a liquid crystal display (LCD) overdrive system, said method comprising:
   receiving original image data for display on an LCD display;
   sending said original image data to an overdrive calculation module for calculation of overdrive image data;
   sending said overdrive image data to a prediction module for calculation of predicted image data;
   reducing a bit depth of said predicted image data using a non-linear mapping function thereby creating reduced image data;
   converting said reduced image data from a luminance-integrated color space to a luminance-segregated color space comprising a luminance channel and at least one chrominance channel;
   spatially down-sampling said at least one chrominance channel; and
   compressing said reduced, converted and down-sampled image using spatial redundancy methods, thereby creating compressed image data;
   storing said compressed image data in a buffer;
   decompressing said compressed image data after a delay, thereby creating decompressed, delayed image data; and
   using said decompressed, delayed image data for overdrive-related calculations for a subsequent image frame.

2. A method as described in claim 1 wherein said reducing the bit depth comprises applying a mapping function using a first linear relationship for a first range of values and a second linear relationship for a second range of values.

3. A method as described in claim 2 wherein said first range of values ranges from approximately 0 to approximately 48.

4. A method as described in claim 2 wherein said first linear relationship results in about a 1:1 ratio.

5. A method as described in claim 2 wherein said second linear relationship results in a higher bit-depth reduction than said first linear relationship.

6. A method as described in claim 2 wherein said second linear relationship results in about a ratio between about 2:1 and about 3:1.

7. A method as described in claim 1 wherein said luminance-integrated color space is an RGB color space.

8. A method as described in claim 1 wherein said luminance-segregated color space is a YCbCr color space.

9. A method as described in claim 1 wherein said spatially down-sampling comprises about a 4:1 reduction in chrominance channel data.

10. A method as described in claim 1 wherein said compressing comprises adaptive block truncation coding (ABTC) compression.

11. A method as described in claim 1 wherein said compressing comprises DCT compression.

* * * * *